United States Patent
Wen et al.

(10) Patent No.: US 11,038,338 B2
(45) Date of Patent: Jun. 15, 2021

(54) MICRO-LOSS COMBINED MECHANICAL DC CIRCUIT BREAKER AND ITS CONTROL METHOD

(71) Applicant: TIANJIN UNIVERSITY, Tianjin (CN)

(72) Inventors: Weijie Wen, Tianjin (CN); Bin Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 79 days.

(21) Appl. No.: 16/573,750

(22) Filed: Sep. 17, 2019

(65) Prior Publication Data

US 2020/0014190 A1 Jan. 9, 2020

Related U.S. Application Data

(63) Continuation of application No. PCT/CN2017/118163, filed on Dec. 25, 2017.

(30) Foreign Application Priority Data

Nov. 30, 2017 (CN) .......................... 201711237488X
Nov. 30, 2017 (CN) .......................... 201711237507.9

(51) Int. Cl.
*H02H 3/087* (2006.01)
*H01H 9/54* (2006.01)

(52) U.S. Cl.
CPC ............ *H02H 3/087* (2013.01); *H01H 9/547* (2013.01)

(58) Field of Classification Search
CPC ........... H01H 2009/543; H01H 33/596; H01H 9/541; H01H 9/547; H02H 3/087; H02H 7/125; H02J 1/00
See application file for complete search history.

(56) References Cited

U.S. PATENT DOCUMENTS

| 4,992,904 A * | 2/1991 | Spencer .................. H01H 9/542 361/13 |
| 9,184,003 B2 * | 11/2015 | Crane ..................... H02H 3/087 |
| 10,096,989 B2 * | 10/2018 | Lee ...................... H01H 33/596 |

FOREIGN PATENT DOCUMENTS

| CN | 105656019 A | 6/2016 |
| CN | 107947131 A | 4/2018 |

(Continued)

OTHER PUBLICATIONS (IEEE Xplore Digital Library [online], ieeexplore.ieee.org [retrieved on Jul. 4, 2016], Retrieved from the Internet: <URL:https://ieeexplore.ieee.org/stamp/stamp.jsp?tp=&arnumber=7428893&tag=1 > (Year: 2016).*

(Continued)

*Primary Examiner* — Jared Fureman
*Assistant Examiner* — Nicolas Bellido
(74) *Attorney, Agent, or Firm* — Dragon Sun Law Firm, PC; Jinggao Li, Esq.

(57) ABSTRACT

The present disclosure relates to a micro-loss combined mechanical DC circuit breaker and its control method, consisting n ports, n load current paths and a main breaker; wherein the n load current paths are parallel with the main breaker, and each load current path is divided into an upper bridge arm and a lower bridge arm at a connection point; each port is electrically connected to the connection point of a load current path; the upper bridge arm of each load current path is made of an ultra-fast mechanical switch; the lower bridge arm of each load current path is made of a residual current breaker and a fast closing switch; the main breaker consists of a high-voltage capacitor in series with a low-voltage capacitor that is pre-charged.

6 Claims, 2 Drawing Sheets

(56) References Cited

FOREIGN PATENT DOCUMENTS

CN 107947132 A 4/2018
JP 2016541088 A 12/2016

OTHER PUBLICATIONS

Written Opinion for PCT/CN2017/118163.
International Search Report for PCT/CN2017/118163.

* cited by examiner

MICRO-LOSS COMBINED MECHANICAL DC CIRCUIT BREAKER AND ITS CONTROL METHOD

CROSS-REFERENCE TO RELATED APPLICATIONS

This application is a bypass continuation application of PCT Application No. PCT/CN2017/118163. This application claims priority from PCT Application No. PCT/CN2017/118163, filed Dec. 25, 2017, CN Application No. CN 201711237488x filed Nov. 30, 2017 and CN 2017112375079 filed Nov. 30, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD OF THE INVENTION

The present disclosure relates to the technical field of electrical equipment, and in particular relates to a micro-loss combined mechanical DC circuit breaker with auto-reclosing function and its control method.

BACKGROUND OF THE INVENTION

DC breakers are required to interrupt the fault current, isolate the permanent fault and reclose the transient fault in voltage source converter (VSC) based DC grid quickly, so that the healthy area of DC grids can operate continuously.

Up to now, the main existing technical solutions to DC circuit breakers are solid state DC circuit breaker, hybrid DC circuit breakers and mechanical DC circuit breakers. Mechanical DC circuit breakers have advantages of low construction cost and low operating losses, but they also have the disadvantage of lacking of valid fast auto-reclosing function. Typical mechanical DC circuit breaker topologies are shown in FIGS. 1 and 2, wherein the mechanical DC circuit breaker is made of a residual current breaker (RCB) and three parallel branches, including a load current path, a commutation path, and an energy absorption path. During a normal state, the load current is completely conducted by the load current path, and DC circuit breaker works in micro-loss state. Once a DC fault is detected, the fault current is commutated from the load current path to the commutation path, resulting in a transient interruption voltage across the DC circuit breaker. Driven by this transient interruption voltage, the fault current is further commutated to the energy absorption path, and it decreases to zero gradually, resulting in a residual oscillating current is left through RCB and the commutation path. Finally, the residual current is interrupted by RCB at zero-crossing point.

When interrupting a fault current, the current commutation from the load current path to the commutation path in mechanical DC circuit breakers is the prerequisite for a successful current interruption. Decided by current commutation methods, existing mechanical DC circuit breakers could be divided into two kinds.

The first kind is mechanical DC circuit breakers with a pre-charged capacitor and triggered sphere gap, just as shown in FIG. 1. The maximum voltage on the pre-charged capacitor in FIG. 1 could be very high (about 1.5 times of the system voltage), which makes the pre-charging system for this capacitor very difficult to design and manufacture. If independent pre-charging system is adopted, large volume and high cost cannot be avoided to satisfy the high-voltage insulation requirement between the output side and the input side of the charging system. To avoid the large volume and high cost, the online charging system is used for the capacitor in FIG. 1, which means the capacitor is pre-charged directly by the line in DC grid. However, decided by voltage on DC line, the pre-charged voltage on the capacitor is not constant, resulting in instability of the DC circuit breaker. In addition, the triggered sphere gap with weak arc-extinguishing capability is used to ensure the mechanical DC circuit breaker could interrupt bi-directional current successfully, just as shown in FIG. 1. The triggered sphere gap has problems of long arcing time, short service life. Decided by weak arc-extinguishing capability, the residual voltage on the capacitor after current interruption is not certain, resulting in the working state of the DC circuit breaker in FIG. 1 is not stable.

To avoid problems caused by the online charging system for the pre-charged capacitor and the triggered sphere gap in FIG. 1, a current commutation method based on the transformer coupling is proposed, just as shown in FIG. 2.

With the increasing of rated voltage and rated breaking current of the DC circuit breaker, the voltage on the capacitor in the primary side and the insulation requirements for the fast closing switch on the primary side increase rapidly. In addition, decided by the current commutation method, existing mechanical DC circuit breaker has no valid auto-reclosing function.

In addition, the conventional mechanical DC circuit breaker shown in FIG. 1 and FIG. 2 can only interrupt the fault current on one line. If conventional mechanical DC circuit breakers are utilized in DC grid, the number of DC circuit breakers installed on each DC bus is equal to the number of incoming or outgoing lines connecting with this DC bus. In other words, tens of even hundreds of DC circuit breakers are needed in DC grid. Considering that DC circuit breaker is much more expensive than AC circuit breaker, so many DC circuit breakers could result in significant facility cost of DC grid.

Therefore, a heretofore unaddressed need exists in the art to address the aforementioned deficiencies and inadequacies.

SUMMARY OF THE INVENTION

The objective of the present disclosure is to overcome the shortcomings of the prior art and to provides a DC circuit breaker with features of low cost, micro operating losses and auto-reclosing function. The present disclosure is achieved by the following technical scheme:

A micro-loss combined mechanical DC circuit breaker includes n ports, n load current paths and a main breaker; wherein the n load current paths are connected in parallel with the main breaker; each load current path is divided into an upper bridge arm and a lower bridge arm at a connection point; each port is electrically connected with the connection point of each load current path; the upper bridge arm of load current path is made of a ultra-fast mechanical switch; the lower bridge arm of load current path is made of a residual current breaker and a fast closing switch; the main breaker is made of a high-voltage capacitor in series with a low-voltage capacitor; the high-voltage capacitor is not pre-charged, and it is parallel with an arrester and a high-voltage resistor; the low-voltage capacitor is pre-charged with a certain voltage; the negative end of the low-voltage capacitor is connected with the anode of a diode and the positive end of the low-voltage capacitor is connected with the cathode of a diode.

Preferably, the ultra-fast mechanical switch on the upper bridge arm and the residual current breaker on the lower bridge arm in all load current paths of the micro-loss combined mechanical DC circuit breaker are driven by high-speed operating mechanisms. The energy stored in the high-speed operating mechanism is adequate to make sure ultra-fast mechanical switch could complete the action sequence of O(open)-C(close) during the current interruption process and the auto-reclosing process. The energy stored in the high-speed operating mechanism is adequate to ensure residual current breaker could complete the action sequence of O(open)-C(close)-O(open) during the current interruption process and the auto-reclosing process. The opening and closing time of the high-speed operating mechanism is in the order of several milliseconds. The fast closing switches on the lower bridge arm of all load current paths could be several sets of thyristor anti-paralleled with diode in series.

During the normal state, the ultra-fast mechanical switches on the upper bridge arms are closed; residual current breakers on the lower bridge arms are closed; thyristors in fast closing switches on the lower bridge arms are turned off. Under this circumstance, the load current only flows through the ultra-fast mechanical switches on the upper bridge arms of all load current paths, resulting in the DC circuit breaker works in micro-loss state.

The fault current interruption of the micro-loss combined mechanical DC circuit breaker is described as follows:
when a fault occurs to the line connecting with a port of the DC circuit breaker, open command is sent to the ultra-fast mechanical switch of the upper bridge arm in the load current path connecting to the port with faulty line, and contacts of this ultra-fast mechanical switch are separated with arcing; meanwhile, open commands are sent to the residual current circuit breaker of the lower bridge arm in load current path connecting to the ports with healthy lines, and contacts of these residual current breaker are separated without arcing; after a time delay when contacts of this ultra-fast mechanical switch and these residual current breakers are separated far enough, a turn-on command is sent to thyristors in the fast closing switch on the lower bridge arm in the load current path connecting to the port with faulty line, and an open command is sent to the residual current breaker on the same lower bridge arm. Driven by the pre-charged voltage on low-voltage capacitor in the main breaker, the fault current starts commutating from the upper bridge arm of the load current path connecting to the port with faulty line to the main breaker in series with the lower bridge arm of the load current path connecting to the port with faulty line until ultra-fast mechanical switch on the upper bridge arm of the load current path connecting to the port with faulty line is extinguished at zero crossing point; after the current commutation, with the fault current charging the high-voltage capacitor in the main breaker continuously, transient interruption voltage on high-voltage capacitor increases until the fault current is further commutated to the arrester, and the transient interruption voltage is limited to the clamping voltage of arrester; caused by this transient interruption voltage, the fault current decreases gradually; after the residual energy in DC grid is completely absorbed by the arrester, the residual current is left through the high-voltage capacitor, the low-voltage capacitor anti-parallel with diode and residual current breaker on the lower bridge arm of the load current path connecting to the port with faulty line; finally, the residual current is interrupted by residual current breaker at zero-crossing point.

The auto-reclosing of the micro-loss combined mechanical DC circuit breaker is described as follows:

For a permanent fault: after the interruption of fault current, an interval of hundreds of milliseconds is reserved for the de-ionization of the fault point; then, close the residual current breaker on the lower bridge arm of the load current path connecting to the port with faulty line and sent turn-on signal to thyristor in the fast closing switch on the same lower bridge arm; when an oscillating re-closing current is detected, open this residual current breaker again to interrupt this re-closing current; meanwhile, close the other residual current breaker on other lower bridge arm of load current path connecting to ports with healthy lines.

For a transient fault: after the interruption of fault current, an interval of hundreds of milliseconds is reserved for the de-ionization of the fault point, close the residual current breaker on the lower bridge arm of the load current path connecting to the port with faulty line and sent turn-on signal to the thyristor in the fast closing switch on the same lower bridge arm; no re-closing current is detected; close the other residual current breaker on the lower bridge arm of load current path connecting to ports with healthy lines and the ultra-fast mechanical switch on the upper bridge arm of load current path connecting to the port with faulty line; withdraw the turn-on signal to the thyristor in the fast closing switch on the lower bridge arm of load current path connecting to the port with faulty line.

Compared to the prior art, the technical scheme of the present disclosure has the following beneficial effects:

The DC circuit breaker of the present disclosure could works in micro-loss state during normal state, meaning almost no operating cost; the DC circuit breaker of the present disclosure could interrupt fault current on all incoming or outgoing lines connecting on the same DC bus, meaning the number and cost of DC circuit breaker in DC grid could be reduced significantly; the DC circuit breaker of the present disclosure has auto-reclosing function without producing overcurrent or overvoltage, which could ensure the safety and stability of DC grid with overhead lines.

BRIEF DESCRIPTION OF THE DRAWINGS

The accompanying drawings illustrate one or more embodiments of the present disclosure and together with the written description, serve to explain the principles of the invention. Wherever possible, the same reference numbers are used throughout the drawings to refer to the same or like elements of an embodiment.

DETAILED DESCRIPTION OF THE EMBODIMENTS

The technical solution of the present disclosure will be further described below in detail by specific embodiments with reference to the accompanying drawings. The specific embodiments to be described are merely for explaining the present disclosure, rather than limiting the present disclosure.

Figure 1:
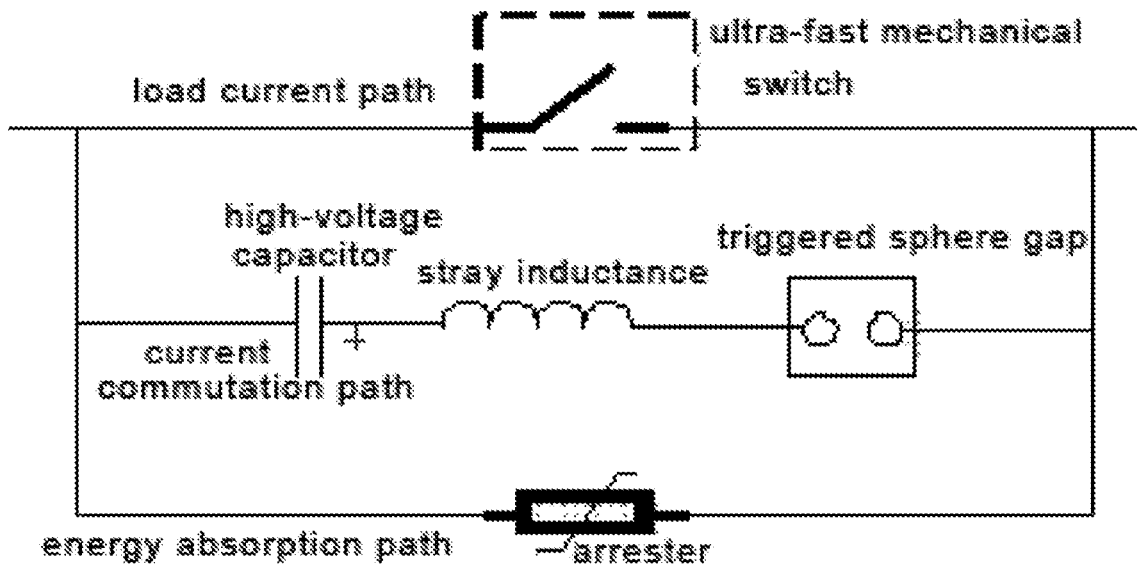
FIG. 1 is a schematic diagram of a mechanical DC circuit breaker with pre-charged capacitor and triggered sphere gap.
Figure 2:
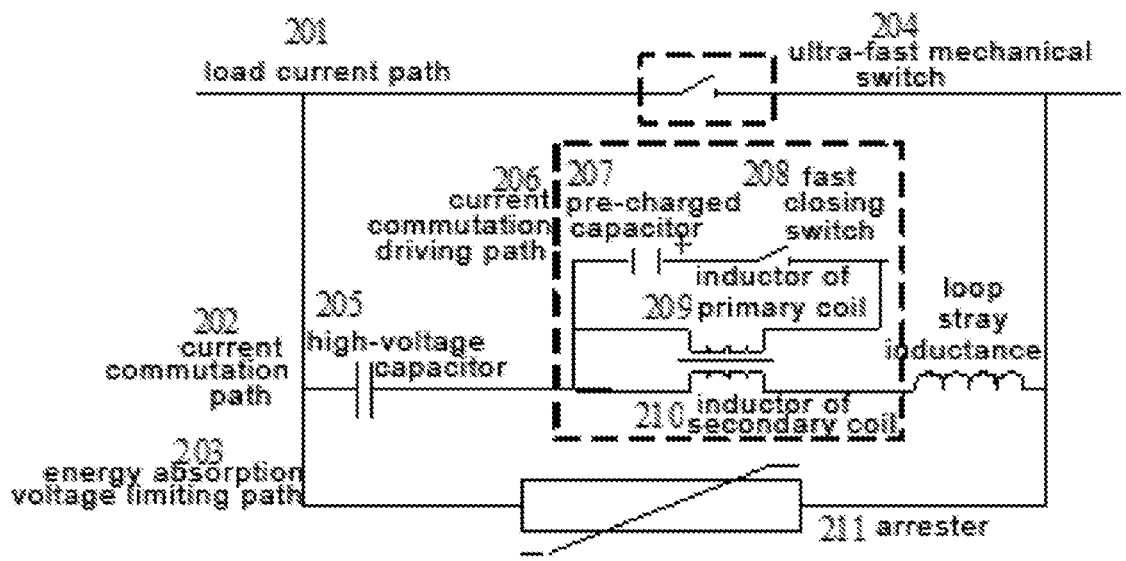
FIG. 2 is a schematic diagram of a mechanical DC circuit breaker with current commutation drive circuit.
Figure 3:
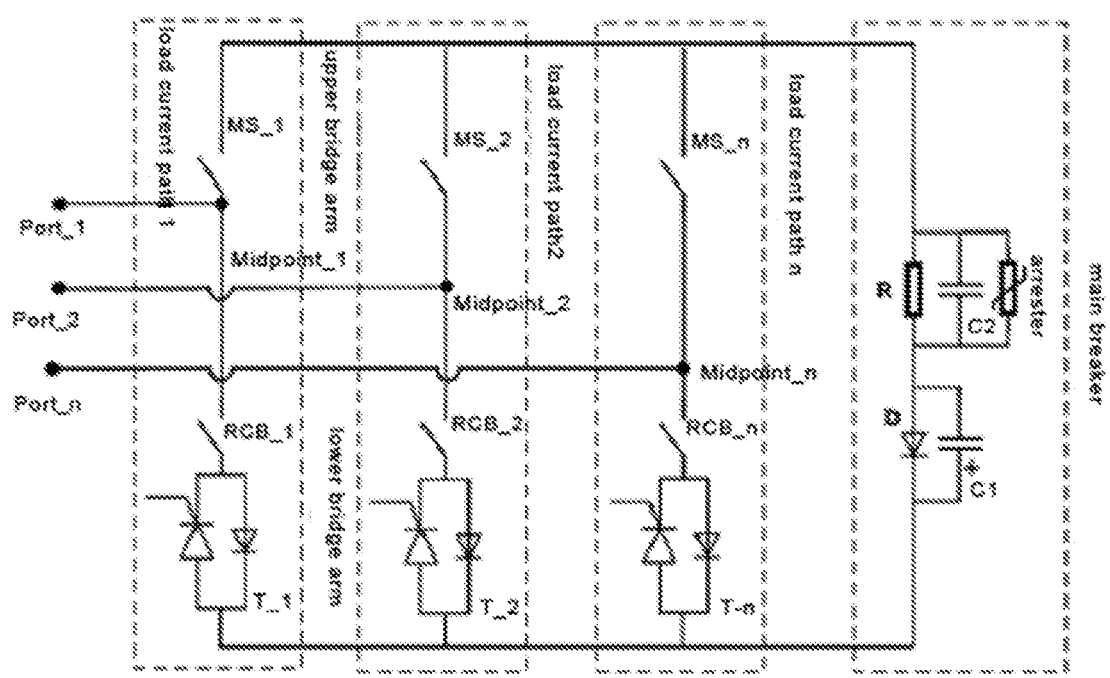
FIG. 3 is a schematic diagram of a detailed embodiment of a micro-loss combined mechanical DC circuit breaker with auto-reclosing function of the present disclosure.

FIG. 3 shows a schematic diagram of a detailed embodiment of a micro-loss combined mechanical DC circuit breaker with auto-reclosing function of the present disclosure. As shown in FIG. 3, a micro-loss combined mechanical DC circuit breaker 300 includes n ports (Port_1, Port_2, Port_n), n load current paths (LCP_1, LCP_2, LCP_n) and a main breaker; wherein the load current path (LCP_1, LCP_2, LCP_n) are connected in parallel with the main breaker, each load current path is divided into an upper bridge arm and a lower bridge arm at a connection point (Midpoint_1,Midpoint_2,Midpoint_n), each port (Port_1, Port_2, Port_n) is electrically connected to each connection point (Midpoint_1,Midpoint_2,Midpoint_n) of each load current path (LCP_1, LCP_2, LCP_n).

In a detailed embodiment of a micro-loss combined mechanical DC circuit breaker with auto-reclosing function of the present disclosure, an upper bridge arm of each load current path (LCP_1, LCP_2, LCP_n) is made of an ultra-fast mechanical switch (MS_1, MS_2, MS_n).

In a detailed embodiment of a micro-loss combined mechanical DC circuit breaker with auto-reclosing function of the present disclosure, the ultra-fast mechanical switch (MS_1, MS_2, MS_n) is driven by high-speed operating mechanism, and the energy stored in the high-speed operating mechanism is adequate to ensure that the ultra-fast mechanical switch (MS_1, MS_2, MS_n) could complete the action sequence of O(open)-C(close) during the current interruption process and the auto-reclosing process.

In a detailed embodiment of a micro-loss combined mechanical DC circuit breaker with auto-reclosing function of the present disclosure, the lower bridge arm of each load current path (LCP_1, LCP_2, LCP_n) is made of a residual current breaker (RCB_1, RCB_2, RCB_n) and a fast closing switch (T_1, T_2, T_n) in series.

In a detailed embodiment of a micro-loss combined mechanical DC circuit breaker with auto-reclosing function of the present disclosure, the residual current breakers (RCB_1, RCB_2, RCB_n) is driven by high-speed operating mechanism, and the energy stored in the high-speed operating mechanism is adequate to ensure the residual current breaker (RCB_1, RCB_2, RCB_n) can complete the action sequence of O(open)-C(close)-O(open) during the current interruption process and the auto-reclosing process.

In a detailed embodiment of a micro-loss combined mechanical DC circuit breaker with auto-reclosing function of the present disclosure, the turn-on time of fast closing switch (T_1, T_2, T_n) is in the order of several microseconds. For example, fast closing switch could be realized by several sets of thyristor anti-parallel with diode in series.

In a detailed embodiment of a micro-loss combined mechanical DC circuit breaker with auto-reclosing function of the present disclosure, the main breaker is made of a high-voltage capacitor (C2) and a low-voltage capacitor (C1) in series. The high voltage capacitor (C2) is parallel with a high voltage resistor (R) and a metal oxide arrester (MOV), and the high-voltage capacitor (C2) is not pre-charged. The low-voltage capacitor (C1) is pre-charged with certain voltage, and it is anti-paralleled with a diode (D), meaning negative end of the low-voltage capacitor (C1) is connected with the anode of the diode (D), and positive end of the low-voltage capacitor (C1) is connected with the cathode of the diode (D).

Specifically, during a normal state, the ultra-fast mechanical switches (MS_1, MS_2, MS_n) on the upper bridge arm of the load current path (LCP_1, LCP_2, LCP_n) are closed; the residual current breakers (RCB_1, RCB_2, RCB_n) on the lower bridge arm of the load current path (LCP_1, LCP_2, LCP_n) are closed; thyristors in the fast closing switch (T_1, T_2, T_n) on the lower bridge arms of the load current path (LCP_1, LCP_2, LCP_n) are turned off; load current only flows through the ultra-fast mechanical switch (MS_1, MS_2, MS_n) on the upper bridge arm of the load current path (LCP_1, LCP_2, LCP_n), and the DC circuit breaker works in micro-loss state.

During the current interruption process, when a fault occurs to the incoming or outgoing line connecting with the DC circuit breaker, taking the fault occurring to the line connecting with Port_1 as an example, open command is sent to the ultra-fast mechanical switch (MS_1) on the upper bridge arm of LCP_1 connecting to port_1, and contacts of this ultra-fast mechanical switch (MS_1) is separated with arcing; meanwhile, open command is sent to the residual current breaker (RCB_2, RCB_n) on the lower bridge arm of the load current paths (LCP_2, LCP_n) connecting to ports (Port_2, Port_n) with healthy lines, and contacts of these residual current breakers (RCB_2, RCB_n) are separated without arcing. When contacts of this ultra-fast mechanical switch (MS_1) and these residual current breakers (RCB_2, RCB_n) are separated far enough, turn-on signal is sent to the thyristors in the fast closing switch (T_1) on the lower bridge arm of the LCP_1 connecting with Port_1 with faulty line. Driven by the pre-charge voltage on C1, the fault current starts commutating from the upper bridge arm of LCP 1 connecting to port 1 with faulty line to the main breaker in series with the lower bridge arm of LCP 1 connecting to Port 1 with fault line until MS 1 on the upper bridge arm of LCP 1 is extinguished at zero-crossing point; after the current commutation, with the fault current charging C2 in the main breaker continuously, transient interruption voltage on C2 increases until the fault current is further commutated to MOV and the transient interruption voltage is limited to the clamping voltage of MOV; caused by this transient interruption voltage, the fault current decreases gradually; after the residual energy in DC grid is completely absorbed by MOV, the residual current is left through C2, C1 anti-parallel with D and RCB 1 on the lower bridge arm of LCP 1 connecting to Port 1 with faulty line; finally, the residual current is interrupted by RCB 1 at zero-crossing point.

During the auto-reclosing process, there are two different situations to be solved.

For a permanent fault: after the interruption of fault current, an interval of hundreds of milliseconds is reserved for the de-ionization of the fault point; then, close RCB_1 on the lower bridge arm of LCP_1 connecting to Port_1 with faulty line and sent turn-on signal to the thyristors in T_1 on the lower bridge arm of LCP_1 connecting to Port_1 with faulty line; when a oscillating re-closing current is detected, open RCB_1 again to interrupt this re-closing current; meanwhile, close the other residual current breaker (RCB_2, RCB_n) on other lower bridge arm of load current paths (LCP_2, LCP_n) connecting to ports (Port_2, Port_n) with healthy lines.

For a transient fault, after the interruption of fault current, an interval of hundreds of milliseconds is reserved for the de-ionization of the fault point, close the RCB_1 on the lower bridge arm of LCP_1 connecting to Port_1 with faulty line and sent turn-on signal to thyristor in T_1 on the lower bridge arm of LCP_1 connecting to Port_1 with faulty line;

no re-closing current is detected; close other residual current breaker (RCB_2, RCB_n) on the lower bridge arm of load current path (LCP_2, LCP_n) connecting to ports (Port_2, Port_n) with healthy lines and MS_1 on the upper bridge arm of LCP_1 connecting to Port_1 with faulty line; withdraw the turn-on signal to thyristor in T_1 on the lower bridge arm of LCP_1 connecting to Port_1 with faulty line.

In reference to the foregoing exemplary description, it will be clear to those skilled in the art that the present disclosure has the following beneficial effects:

1. The present disclosure can design the port number of the combined DC circuit breaker according to the incoming or outgoing line number of the DC bus, and ensure that only a combined DC circuit breaker is needed for a DC bus. As a result, the number and cost of DC circuit breaker in DC grid could be reduced significantly.
2. During the normal state, load current flows only through the ultra-fast mechanical switches on the upper bridge arm of load current path, and the DC circuit breaker works in micro-loss state, meaning almost no operating cost.
3. The DC circuit breaker of the present disclosure has auto-reclosing function without producing overcurrent or overvoltage, which could ensure the safety and stability of DC grid with overhead lines.

Although the functions and working processes of the present disclosure have been described above in reference to the accompanying drawings, the present disclosure is not limited thereto. The foregoing specific implementations are merely illustrative but not limiting. A person of ordinary skill in the art may make various forms under the teaching of the present disclosure without departing from the purpose of the present disclosure and the protection scope of the appended claims, and all the forms shall fall into the protection scope of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A micro-loss combined mechanical DC circuit breaker comprising: n ports, n load current paths and a main breaker; wherein
    the n load current paths are connected in parallel with the main breaker; each load current path is divided into an upper bridge arm and a lower bridge arm by a connection point;
    each port is electrically connected to the connection point of a load current path;
    the upper bridge arm of each load current path is made of an ultra-fast mechanical switch;
    a lower bridge arm of each load current path is made of a residual current breaker and a fast closing switch in series;
    the main breaker is made of a high-voltage capacitor and a low-voltage capacitor in series;
    the high-voltage capacitor is parallel with a high-voltage resistor and an arrester, and the high-voltage arm capacitor is not pre-charged; and
    the low-voltage capacitor is pre-charged with a certain voltage; the low-voltage capacitor is anti-parallel with a diode that the negative end of the low-voltage capacitor is electrically connected to the anode of the diode, and the positive end of the low-voltage capacitor is electrically connected to the cathode of the diode.

2. The DC circuit breaker according to claim 1, wherein the residual current breakers are driven by high-speed operating mechanisms; the energy stored in the high-speed operating mechanism is to ensure that the residual current breaker can complete the action sequence of O(open)-C(close)-O(open); and the operating time of the residual current breaker is in the order of several milliseconds.

3. The DC circuit breaker according to claim 1, wherein ultra-fast mechanical switches are driven by high-speed operating mechanisms, and the energy stored in the high-speed operating mechanism is to ensure that the ultra-fast mechanical switch can complete the action sequence of O(open)-C(close); and the operating time of the ultra-fast mechanical switch is in the order of several milliseconds.

4. The DC circuit breaker according to claim 1, wherein during a normal state, the ultra-fast mechanical switches on the upper bridge arms in the n load current paths are closed; the residual current breakers on the lower bridge arms in the n load current paths are closed; thyristors in fast closing switches on the lower bridge arms in the n load current paths are turned off; load current only flows through the ultra-fast mechanical switches on the upper bridge arms of the n load current paths, and the DC circuit breaker works in a micro-loss state.

5. A fault current interruption method by using the DC circuit breaker according to claim 1 is as follows:
    when a fault occurs to a line connecting with a port of the DC circuit breaker, sending an open command to the ultra-fast mechanical switch of the upper bridge arm in the load current path connecting to the port with faulty line, and contacts of this ultra-fast mechanical switch are separated with arcing; meanwhile, sending the open commands to the residual current circuit breaker of the lower bridge arm in load current path connecting to the ports with healthy lines, and contacts of these residual current breaker are separated without arcing; after a time delay when contacts of this ultra-fast mechanical switch and these residual current breakers are separated far enough, sending a turn-on command to thyristors in the fast closing switch on the lower bridge arm in the load current path connecting to the port with faulty line, and sending an open command to the residual current breaker on the same lower bridge arm; driven by the pre-charged voltage on low-voltage capacitor in the main breaker, commutating the fault current from the upper bridge arm of the load current path connecting to the port with faulty line to the main breaker in series with the lower bridge arm of the load current path connecting to the port with faulty line until ultra-fast mechanical switch on the upper bridge arm of the load current path connecting to the port with faulty line is extinguished at zero crossing point; after the current commutation, with the fault current charging the high-voltage capacitor in the main breaker continuously, increasing transient interruption voltage on high-voltage capacitor until the fault current is further commutated to the arrester, and limiting the transient interruption voltage to the clamping voltage of arrester so as to decrease the fault current gradually; after the residual energy in DC grid is completely absorbed by the arrester, the residual current flowing through the high-voltage capacitor, the low-voltage capacitor anti-parallel with diode and residual current breaker on the lower bridge arm of the load current path connecting to the port with faulty line; and finally interrupting the residual current by residual current breaker at zero-crossing point.

6. An auto-reclosing method by using the DC circuit breaker according to claim 1 is as follows:

for a permanent fault: after the interruption of fault current, reserving an interval of hundreds of milliseconds for the de-ionization of the fault point; then closing the residual current breaker on the lower bridge arm of the load current path connecting to the port with faulty line and sending the turn-on signal to the thyristor in the fast closing switch on the same lower bridge arm; when a re-closing current, which is oscillating, is detected, opening the residual current breaker again to interrupt there-closing current; meanwhile, closing the other residual current breaker on other lower bridge arm of load current path connecting to ports with healthy lines; and for a transient fault: after the interruption of fault current, reserving an interval of hundreds of milliseconds for the de-ionization of the fault point, closing the residual current breaker on the lower bridge arm of the load current path connecting to the port with faulty line and sent turn-on signal to thyristor in the fast closing switch on the same lower bridge arm; no re-closing current is detected; closing the other residual current breaker on the lower bridge arm of load current path connecting to ports with healthy lines and the ultra-fast mechanical switch on the upper bridge arm of load current path connecting to the port with faulty line; withdrawing the turn-on signal to thyristor in the fast closing switch on the lower bridge arm of load current path connecting to the port with faulty line.

* * * * *